United States Patent
Ho

(10) Patent No.: US 12,086,553 B2
(45) Date of Patent: Sep. 10, 2024

(54) ANTICIPATORY DIALOG DESIGN FOR QUESTION ANSWERING WITH A RELATIONAL DATABASE

(71) Applicant: INTERNATIONAL BUSINESS MACHINES CORPORATION, Armonk, NY (US)

(72) Inventor: Tin Kam Ho, Millburn, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 140 days.

(21) Appl. No.: 17/351,334

(22) Filed: Jun. 18, 2021

(65) Prior Publication Data
US 2022/0405483 A1    Dec. 22, 2022

(51) Int. Cl.
*G06F 40/35* (2020.01)
*G06F 16/242* (2019.01)
(Continued)

(52) U.S. Cl.
CPC .......... *G06F 40/35* (2020.01); *G06F 16/2425* (2019.01); *G06F 40/247* (2020.01); *G06F 40/289* (2020.01); *G10L 15/1815* (2013.01)

(58) Field of Classification Search
CPC ...... G06F 40/35; G06F 40/247; G06F 40/289; G06F 16/2425; G06F 16/35;
(Continued)

(56) References Cited

U.S. PATENT DOCUMENTS

| | | | |
|---|---|---|---|
| 9,575,963 B2 * | 2/2017 | Pasupalak | G06F 40/35 |
| 9,633,006 B2 * | 4/2017 | Ryu | G06F 16/243 |

(Continued)

FOREIGN PATENT DOCUMENTS

EP    3468150 A1 *    4/2019    ......... G06F 16/3329

OTHER PUBLICATIONS

Affolter et al., "A comparative survey of recent natural language interfaces for databases," The VLDB Journal, Published online: Aug. 28, 2019, vol. 28, https://doi.org/10.1007/s00778-019-00567-8, pp. 793-819.

(Continued)

*Primary Examiner* — Richemond Dorvil
*Assistant Examiner* — Nadira Sultana
(74) *Attorney, Agent, or Firm* — Robert R. Aragona

(57) ABSTRACT

An embodiment for creating a dialog based on anticipated questions for database driven conversations is provided. The embodiment may include receiving content from a database. The embodiment may also include identifying one or more schemas, one or more entities, and relational data in the content. The embodiment may further include identifying a semantic type and a number of distinct entries for each entity. The embodiment may also include presenting choices for one or more query targets and one or more filtering conditions to a user. The embodiment may further include prompting the user for one or more annotations and one or more clarifying questions for each chosen query target and filtering condition. The embodiment may also include generating a plurality of modular phrases and combining the plurality of modular phrases into one or more sentences and paraphrases of the one or more sentences.

11 Claims, 6 Drawing Sheets

(51) Int. Cl.
*G06F 40/247* (2020.01)
*G06F 40/289* (2020.01)
*G10L 15/18* (2013.01)

(58) Field of Classification Search
CPC . G06F 16/252; G06F 16/243; G10L 15/1815; G10L 15/22
See application file for complete search history.

(56) References Cited

U.S. PATENT DOCUMENTS

| | | | |
|---|---|---|---|
| 9,959,311 B2 | 5/2018 | Boguraev | |
| 10,042,921 B2* | 8/2018 | Boguraev | G06F 16/3344 |
| 10,120,863 B2 | 11/2018 | Popescu | |
| 10,169,333 B2 | 1/2019 | Popescu | |
| 10,282,411 B2 | 5/2019 | Popescu | |
| 10,380,258 B2 | 8/2019 | Popescu | |
| 10,402,501 B2* | 9/2019 | Wang | G10L 15/22 |
| 10,839,796 B2* | 11/2020 | Abrahams | G06F 16/3329 |
| 2012/0166180 A1* | 6/2012 | Au | G06F 40/237 704/9 |
| 2015/0314454 A1* | 11/2015 | Breazeal | G10L 15/32 700/259 |
| 2018/0096058 A1* | 4/2018 | Anderson | G06F 16/35 |
| 2019/0042988 A1* | 2/2019 | Brown | G06F 16/9535 |
| 2019/0147098 A1* | 5/2019 | Beller | G06F 16/3334 704/9 |
| 2020/0152184 A1* | 5/2020 | Steedman Henderson | G10L 15/1822 |
| 2021/0081819 A1* | 3/2021 | Polleri | G06N 5/022 |

OTHER PUBLICATIONS

Dimitrakis et al., "A Survey on Question Answering Systems over Linked Data and Documents," Journal of Intelligent Information Systems, DOI: 10.1007/s10844-019-00584-7 (accepted for publication, 2019), 28 pages.

Morph.AI Help Center, "[Facebook] How to build an E-commerce Chatbot," [accessed: Apr. 6, 2021], Retrieved from the Internet: https://support.zoho.com/portal/morphai/en/kb/articles/facebook-how-to-build-an-e-commerce-chatbot, 7 pages.

Owda et al., "Conversation-Based Natural Language Interface to Relational Databases," 2007 IEEE/WIC/ACM International Conferences on Web Intelligence and Intelligent Agent Technology—Workshops, DOI 10.1109/WI-IATW.2007.60, pp. 363-367.

Özcan et al., "State of the Art and Open Challenges in NL Interfaces to Data" IBM, SIGMOD 2020, Jun. 2020, Retrieved from https://leichuan.github.io/files/sigmod20-tutorial.pdf, 76 pages.

Ozyurt et al., "Bio-AnswerFinder: a system to find answers to questions from biomedical texts," Database, 2020, Oxford University Press, doi: 10.1093/database/baz137, 12 pages.

Skowronek, "1. Laying the Groundwork for Your First Chatbot—Anyone can build a bot with Chatfuel—no code necessary. Here's how to prepare and plan for designing your first one." Chatfuel, [accessed: Apr. 6, 2021], Retrieved from the internet: https://docs.chatfuel.com/en/articles/2310939-1-laying-the-groundwork-for-your-first-chatbot, 5 pages.

Zeng et al., "Photon: A Robust Cross-Domain Text-to-SQL System," arXiv:2007.15280v2 [cs.CL] Aug. 3, 2020, Retrieved from the Internet: https://arxiv.org/pdf/2007.15280.pdf, 12 pages.

Mell et al., "The NIST Definition of Cloud Computing", Recommendations of the National Institute of Standards and Technology, NIST Special Publication 800-145, Sep. 2011, 7 pages.

Ho et al., "Authoring a Conversation Service Module from Relational Data," Application and Drawings, Filed on May 17, 2021, 50 Pages, U.S. Appl. No. 17/322,796.

Khorasani et al., "Automatic Creation Of Schema Annotation Files For Converting Natural Language Queries To Structured Query Language," Application and Drawings, Filed on Dec. 20, 2019, 53 Pages, U.S. Appl. No. 16/722,994.

* cited by examiner

ANTICIPATORY DIALOG DESIGN FOR QUESTION ANSWERING WITH A RELATIONAL DATABASE

BACKGROUND

The present invention relates generally to the field of computing, and more particularly to a system for creating a dialog based on anticipated questions for database driven conversations.

Until recently, conversations have been a back-and-forth dialogue between two or more humans. Conversational services, such as virtual assistants, used by businesses have become increasingly automated, in which a human user communicates with a chatbot designed to simulate speech in lieu of providing direct contact with a live human agent. Research has shown that approximately 50% of all searches will be voice searches by 2020. These conversational services are intended to provide a style of speech that is warm and personalized, qualities which most web-based online interactions lack. For example, a customer may place a shopping order through a virtual assistant on one of their devices, and the virtual assistant aims to understand the context of the conversation and respond in accordance with that context. Often, customer requests seek information contained in a relational database.

SUMMARY

According to one embodiment, a method, computer system, and computer program product for creating a dialog based on anticipated questions for database driven conversations is provided. The embodiment may include receiving content from a database. The embodiment may also include identifying one or more schemas, one or more entities, and relational data in the content. The embodiment may further include identifying a semantic type and a number of distinct entries for each entity. The embodiment may also include presenting choices for one or more query targets and one or more filtering conditions to a user based on the content in the database. The embodiment may further include receiving the chosen one or more query targets and the chosen one or more filtering conditions from the user. The embodiment may also include prompting the user for one or more annotations and one or more clarifying questions for each chosen query target and each chosen filtering condition in response to presenting the choices for the one or more query targets and the one or more filtering conditions to the user. The embodiment may further include generating a plurality of modular phrases based on the one or more query targets and the one or more filtering conditions chosen by the user. The embodiment may also include combining the plurality of modular phrases into one or more sentences and one or more paraphrases of the one or more sentences based on the semantic type of each entity.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
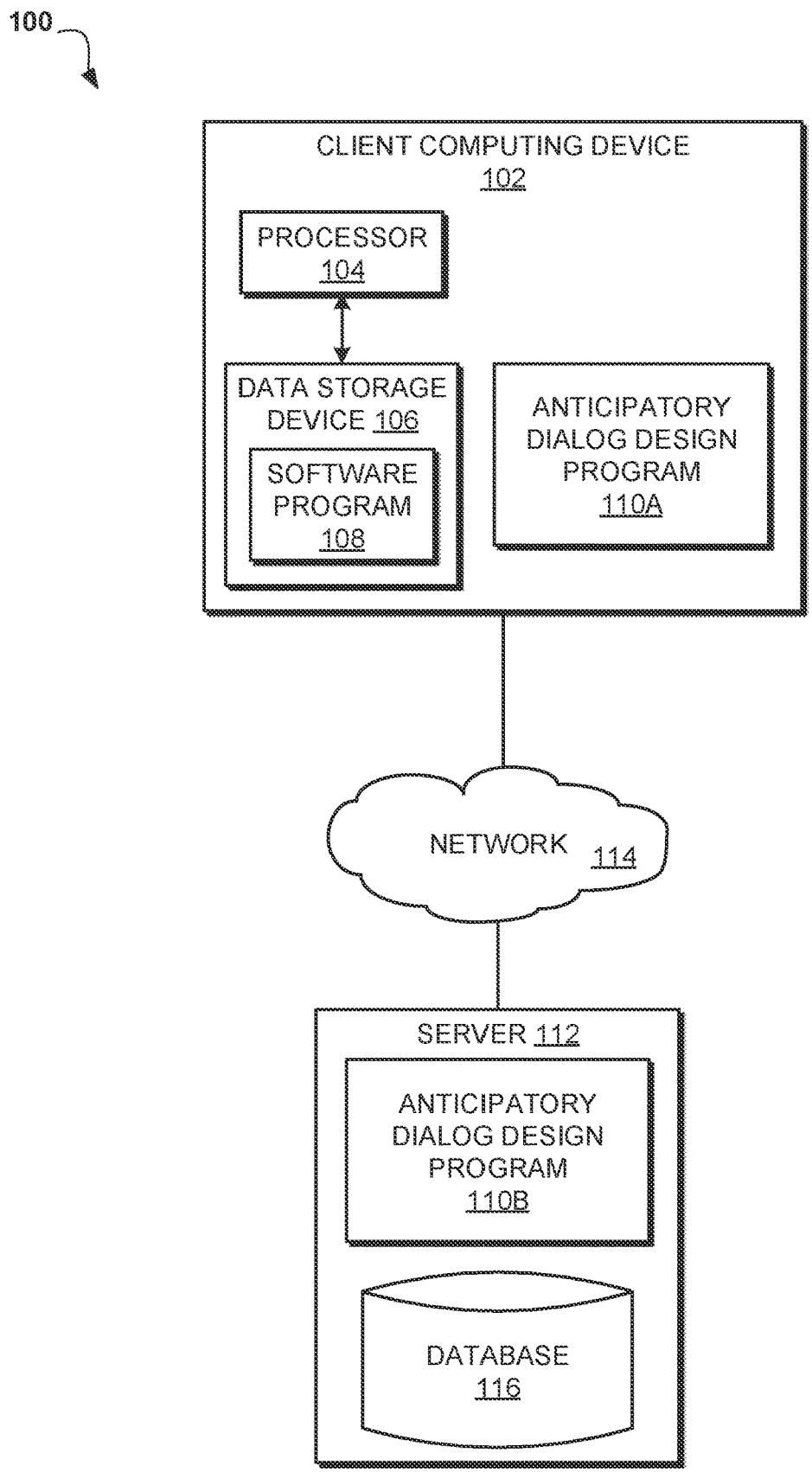
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for creating a dialog based on anticipated questions for database driven conversations. The following described exemplary embodiments provide a system, method, and program product to, among other things, identify a semantic type and number of entities in a relational database and, accordingly, generate and combine modular phrases into complete sentences and paraphrases. Therefore, the present embodiment has the capacity to improve the technical field of dialog authoring in an automated conversation service by simplifying the work required from the conversation service author and accelerating the adoption of the authored dialog into the conversation service. In addition, the present embodiment has the capacity to improve the functioning of a computer by increasing the speed with which a response is returned to a customer, since questions are anticipated prior to being asked by the customer.

As previously described, until recently, conversations have been a back-and-forth dialogue between two or more humans. Conversational services, such as virtual assistants, used by businesses have become increasingly automated, in which a human user communicates with a chatbot designed to simulate speech in lieu of providing direct contact with a live human agent. Research has shown that approximately 50% of all searches will be voice searches by 2020. These conversational services are intended to provide a style of speech that is warm and personalized, qualities which most web-based online interactions lack. For example, a customer may place a shopping order through a virtual assistant on one of their devices, and the virtual assistant aims to understand the context of the conversation and respond in accordance with that context. Often, customer requests seek information contained in a relational database. Current designs of a conversational service for business use require labor-intensive creation of contents necessary to support the service. For example, the intent of the customer when asking a question should be understood when generating a response. Additionally, rule sets are to be implemented to manage the dialog between the customer and the chatbot. This problem is typically addressed by providing online forms to a business client to be filled or customized with expected questions in many possible styles of expressions and suitable responses or actions. However, such forms may not fully anticipate customer questions based on existing content in the database. It may therefore be imperative to have a system in place to create conversation service components systematically and semi-automatically by leveraging the content stored in the relational database. Thus, embodiments of the present invention may provide advantages including, but not limited to, automating the dialog content creation process, accelerating the adoption of the authored dialog into the conversation service, and minimizing the work required from the chatbot author to appropriately manage the dialog between the customer and the chatbot. The present invention does not require that all advantages need to be incorporated into every embodiment of the invention.

According to at least one embodiment, when a user is authoring a dialog, content may be received from a database in order to identify one or more schemas, one or more entities, and relational data in the content. Choices for one or more query targets and one or more filtering conditions may be presented to the user based on the received content in the database. For example, the one or more query targets and the one or more filtering conditions may be presented to the user via a user interface (UI). The user may be prompted for one or more annotations and one or more clarifying questions for each chosen query target and each chosen filtering condition in response to presenting the choices for the one or more query targets and the one or more filtering conditions to the user. A plurality of modular phrases may be generated based on the one or more query targets and the one or more filtering conditions chosen by the user so that the generated plurality of modular phrases may be combined into one or more sentences and one or more paraphrases of the one or more sentences based on the identified semantic type of each entity. According to at least one embodiment, if a corpus of natural utterances is available, the one or more sentences and the one or more paraphrases may be matched to the natural utterances in the corpus. According to at least one other embodiment, if a corpus of natural utterances is not available, the one or more sentences and the one or more paraphrases may be mapped directly into a conversation service without the natural utterances. In essence, the conversation service is responsible for bridging the gap between the anticipated questions and the customer's incoming utterances. This may be done by using a search method or a text classifier.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify a semantic type and number of entities in a relational database and, accordingly, generate and combine modular phrases into complete sentences and paraphrases.

Referring to FIG. 1, an exemplary networked computer environment 100 is depicted, according to at least one embodiment. The networked computer environment 100 may include client computing device 102 and server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an anticipatory dialog design program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running an anticipatory dialog design program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the anticipatory dialog design program 110A, 110B may be a program capable of receiving content from a table in a relational database, identifying a semantic type and number of entities in a relational database, generating and combining modular phrases into complete sentences and paraphrases, automating the dialog content creation process, accelerating the adoption of the authored dialog into the conversation service, and minimizing the work required from the chatbot author to appropriately manage the dialog between the customer and the chatbot. The anticipatory dialog design method is explained in further detail below with respect to FIGS. 2A and 2B.

Figure 2A:
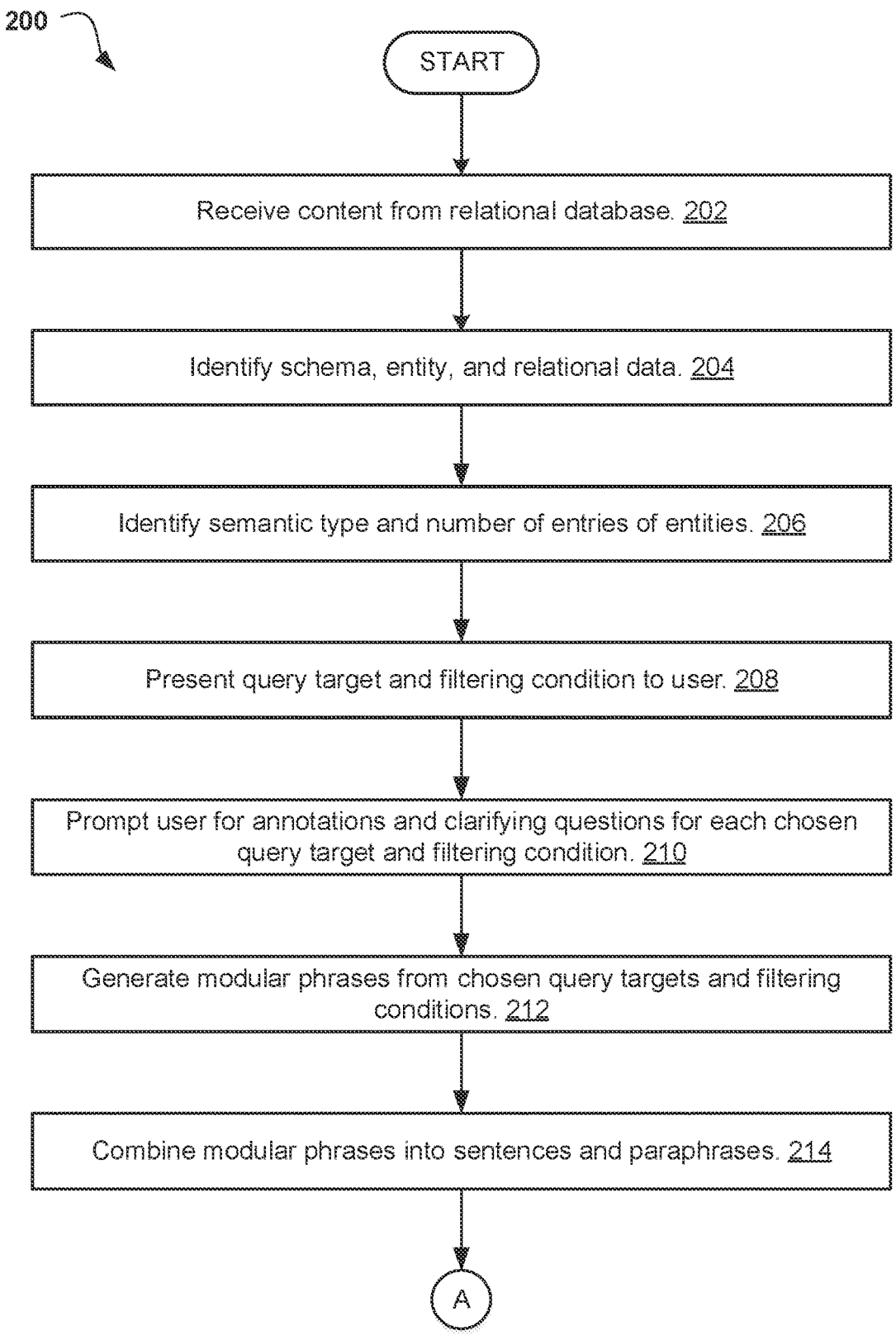
FIG. 2A illustrates an operational flowchart for creating a dialog based on anticipated questions for database driven conversations in an anticipatory dialog design process according to at least one embodiment.

Referring now to FIG. 2A, an operational flowchart for creating a dialog based on anticipated questions for database driven conversations in an anticipatory dialog design process 200 is depicted according to at least one embodiment. At 202, the anticipatory dialog design program 110A, 110B receives content from the database. Using the software program 108 on the client computing device 102, the anticipatory dialog program 110A, 110B may receive the content. As used herein, "content" is a catchall term that includes all data related to the database. It may be appreciated that in embodiments of the present invention, the database may be a relational database. Tables in the relational database may be of the "entity-attribute" type, in which each row of the table represents an instance of a main entity (e.g., a product, place, and/or an event), and each column represents an attribute of that entity (e.g., a size, color, location, timestamp, phone number, and/or price). For example, a row may represent a "restaurant" entry that has attributes including a name, a location, and a menu, and a column may include the name of one or more particular restaurants. The anticipatory dialog design program 110A, 110B may also prompt the user to specify a database connection and access credentials. It may be appreciated that "author" and "user" are used interchangeable herein. Thus, the content received by the anticipatory dialog design program 110A, 110B may also include the specific database connection and access credentials from the user. Continuing the example above, the user may fill in fields on a UI including, but not limited to, "Database Name," "Host," "Port," "User ID," "Password," "Schema," and/or "Table."

Then, at 204, the anticipatory dialog design program 110A, 110B identifies the one or more schemas, the one or more entities, and the relational data in the content. According to at least one embodiment, the schema may exist in the database as a visual representation. According to at least one other embodiment, the schema may be represented by a set of formulas, such as structured query language (SQL). The relational data may include the table as a whole. For example, in a restaurant database, the relational data may include instances of entities (e.g., Name, Borough, Street, Zip Code, Phone Number, and/or Cuisine) and attributes of those entities (e.g., Green Fig, Brooklyn, Flatbush Ave, 10001, 917-222-2222, and/or American, respectively) organized into rows and columns. Details on entities are explained in further detail below with respect to step 206.

Next, at 206, the anticipatory dialog design program 110A, 110B identifies the semantic type and number of distinct entries for each entity. According to at least one embodiment, entities may be categorized by type utilizing natural language processing (NLP). In particular, the NLP may be applied on the content contained in the database. For example, applying a named entity detection or concept detection technique from NLP to the "Street" and "Cuisine" fields may indicate that the semantic type for "Street" is a place and the semantic type for "Cuisine" is a set of food choices. According to at least one embodiment, the semantic type may be entered manually by the user via the UI, i.e., the user may specify the database is a restaurant database, or that a specific column is a location.

Each entity type may have one or more distinct entries associated with it. Continuing the example above where the database is a restaurant database, the instances of entities may include "Name," "Borough," "Street," "Zip Code," "Phone Number," and/or "Cuisine." The distinct entries may correspond to each of these instances. For example:

| Name | Borough | Street | Zip Code | Phone | Cuisine |
| --- | --- | --- | --- | --- | --- |
| Garden Restaurant | Manhattan | W 181$^{st}$ ST | 10033 | 212-333-3333 | Chinese |
| Natural Juice Bar | Queens | Seneca Ave | 11385 | 917-444-4444 | Juice |
| Cesca | Brooklyn | Atlantic Ave | 11209 | 646-555-5555 | Italian |

Thus, referring to the table above, there are three distinct entries for each of "Name," "Borough," "Street," "Zip Code," "Phone Number," and "Cuisine." Alternatively, if in a different table, the "Borough" for each restaurant had been Manhattan, there would only be one distinct entry for that entity. Similarly, if "Cuisine" included "Chinese," "Italian," and "Italian," there would be two distinct entries for that entity.

The semantic type and number of distinct entries for each entity may be utilized by the anticipatory dialog design program 110A, 110B to anticipate the questions that may be asked by a customer, i.e., an end user who is using the conversation service after it is launched. Examples of these questions include, but are not limited to:

"What restaurants are in Manhattan?"
"What is the phone number of Garden Restaurant?"
"Which street is Cesca on?"
"Where is Natural Juice Bar in Queens?"
"Which restaurant on 181$^{st}$ Street in Manhattan serves Chinese food?"

Details on creating these questions are explained in further detail below with respect to steps 212 and 214.

Then, at 208, the anticipatory dialog design program 110A, 110B presents the choices for the one or more query targets and the one or more filtering conditions to the user. The choices for the one or more query targets and the one or more filtering conditions may be presented based on the content in the database.

In embodiments of the present invention, a query target may be the instances of the one or more entities in the database. Continuing the example above, the one or more query targets in the restaurant database presented to the user may include "Name," "Borough," "Street," "Zip Code," "Phone Number," and/or "Cuisine." As a default, the anticipatory dialog design program 110A, 110B may present all of the query targets in the database to the user. For example, as described in the table above, each of "Name," "Borough," "Street," "Zip Code," "Phone Number," and "Cuisine" may be presented to the user. The user may then choose the desired query targets through the UI, which are then received by the anticipatory dialog design program 110A, 110B.

In embodiments of the present invention, a filtering condition may be available filters that could be applied to the database. In the table above, filters may include any combinations of complete or partial values in "Name," "Borough," "Street," "Zip Code," "Phone Number," and/or "Cuisine." Examples of filters available in other restaurant databases include, but are not limited to, "Hours of Operation," "Price," "Wi-Fi Available," "Delivery," "Takeout," "Accepts Credit Cards," and/or "Distance." As a default, the anticipatory dialog design program 110A, 110B may present all of the available filters for the database to the user. For example, each of "Hours of Operation," "Price," "Wi-Fi Available," "Delivery," "Takeout," "Accepts Credit Cards," and "Distance" may be presented to the user. The user may then choose the desired filtering conditions through the UI, which are then received by the anticipatory dialog design program 110A, 110B.

Next, at 210, the anticipatory dialog design program 110A, 110B prompts the user for the one or more annotations and the one or more clarifying questions for each chosen query target and each chosen filtering condition. According to at least one embodiment, the prompt may be in the form of a pop-up window displayed in the UI. According to at least one other embodiment, the prompt may be text written in a chat window, within the user interface, below the selections made by the user.

According to at least one embodiment, the annotation may be a keyword that represents the query target or the filtering condition. The keyword entered by the user may simply be a reiteration of the query targets and filtering conditions that were presented to the user. For example, if the query target chosen by the user is "Name," the user can simply enter "Name" as the keyword for that query target. Similarly, if the filtering condition chosen by the user is "Hours of Operation," the user can simply enter "Hours of Operation" as the keyword for that filtering condition. Alternatively, the user may change the keyword for any or all query targets and filtering conditions. For example, a common way of displaying "Name" in a database is "DBA" (i.e., doing business as). Thus, the keyword for the query target "DBA" may be entered as "Name," which is a more likely word used in a conversation. Continuing the example, a keyword for the filtering condition "Hours of Operation" may be entered as "Business Hours."

According to at least one other embodiment, the annotation may be a synonym for the keyword that represents the query target and the filtering condition. For example, if "Name," "Borough," "Street," "Zip Code," "Phone Number," and "Cuisine" are the keywords for the query targets, relevant synonyms may include, but are not limited to, "Food Place," "Area," "Highway," "Postal Code," "Caller," and "Food type," respectively. Continuing the example, if "Hours of Operation," "Price," "Wi-Fi Available," "Delivery," "Takeout," "Accepts Credit Cards," and "Distance" are the keywords for the filtering conditions, relevant synonyms may include, but are not limited to, "Open Until," "Cost," "Internet Available," "For Home," "To Go," "Payments Accepted," and "How far," respectively.

In the present embodiment, once the annotations have been made, the user may enter the one or more clarifying questions for each chosen query target and each chosen filtering condition. The clarifying questions may be questions the conversation service needs to ask the customer to obtain a more accurate representation of the query target or the filtering condition. For example, a clarifying question for the query target "Borough" may be "Which area in New York are you looking into?" A clarifying question for the query target "Cuisine" may be "What types of food do you prefer?" Or, the clarifying question may be "For drinks do you mean a Juice Bar?" Similarly, a clarifying question for the filtering condition "Hours of Operation" may be "When is the restaurant open until?" A clarifying question for the filtering condition "Price" may be "What is the cost of dining there?" A clarifying question for the filtering condition "Takeout" may be "Do you need the restaurant to offer food to go?" The clarifying questions may be used in creating sentences and paraphrases, described in further detail below with respect to step 214. It may be appreciated that one of ordinary skill in the art may envision additional or alternative clarifying questions.

Then, at 212, the anticipatory dialog design program 110A, 110B generates the plurality of modular phrases. The modular phrases may be generated based on the one or more query targets and the one or more filtering conditions chosen by the user. The modular phrases may be generated from the values of the attributes found in the table in the database. Referring to the exemplary table described above with respect to step 206, examples of modular phrases may include, but are not limited to, "Garden Restaurant in Manhattan," "Garden Restaurant on W $181^{st}$ Street," "Café with the postal code 10033," "A phone number with the area code 212," "A Chinese restaurant," "W $181^{st}$ Street in Manhattan," and so on. In this manner, a plethora of modular phrases may be generated so that any question that could potentially be asked of a particular database is known.

Next, at 214, the anticipatory dialog design program 110A, 110B combines the generated plurality of modular phrases into one or more sentences and one or more paraphrases of each sentence. Connecting prepositions or question words may be added to the combinations based on the identified semantic type of each entity. The anticipatory dialog design program 110A, 110B may utilize a natural language generator to synthesize the modular phrases into the one or more sentences and paraphrases. As described above with respect to step 206, examples of these sentences include, but are not limited to:

"What restaurants are in Manhattan?"
"What is the phone number of Garden Restaurant?"
"Which street is Cesca on?"
"Where is Natural Juice Bar in Queens?"
"Which restaurant on $181^{st}$ Street in Manhattan serves Chinese food?"

Additionally, paraphrases for each sentence may be created from the combinations to account for colloquial terms and generalizations, using synonyms or alternative expressions provided by the user or automatically generated using an NLP technique (e.g., bilingual pivoting, which is to translate to a different language and then translate back). For example, paraphrases for each of the sentences above may include, respectively:

"What food places are in Manhattan?"
"What is the number to call Garden Restaurant?"
"What is the address of Cesca?"
"Where is Natural Juice Bar in my area?"
"Which food place on $181^{st}$ Street in my area serves Chinese cuisine?"

According to at least one embodiment, the one or more sentences and paraphrases may be assigned a priority ranking and presented to the user for review and selection. The priority ranking may be assigned based on confidence. The confidence may represent the popularity of a term, the likelihood of an automatically generated paraphrase, or other information about the potential questions or answers (e.g., common assumptions). The anticipatory dialog design program 110A, 110B may use weights learnable from a public corpora or common sense, heuristics, and/or any other technique known in the art to calculate a confidence score. For example, based on the confidence score, the sentences above may be prioritized and displayed to the user for selection as follows:

"#1 What restaurants are in Manhattan?"
"#2 What is the phone number of Garden Restaurant?"
"#3 Which street is Cesca on?"
"#4 Where is Natural Juice Bar in Queens?"
"#5 Which restaurant on $181^{st}$ Street in Manhattan serves Chinese food?"

Figure 2B:
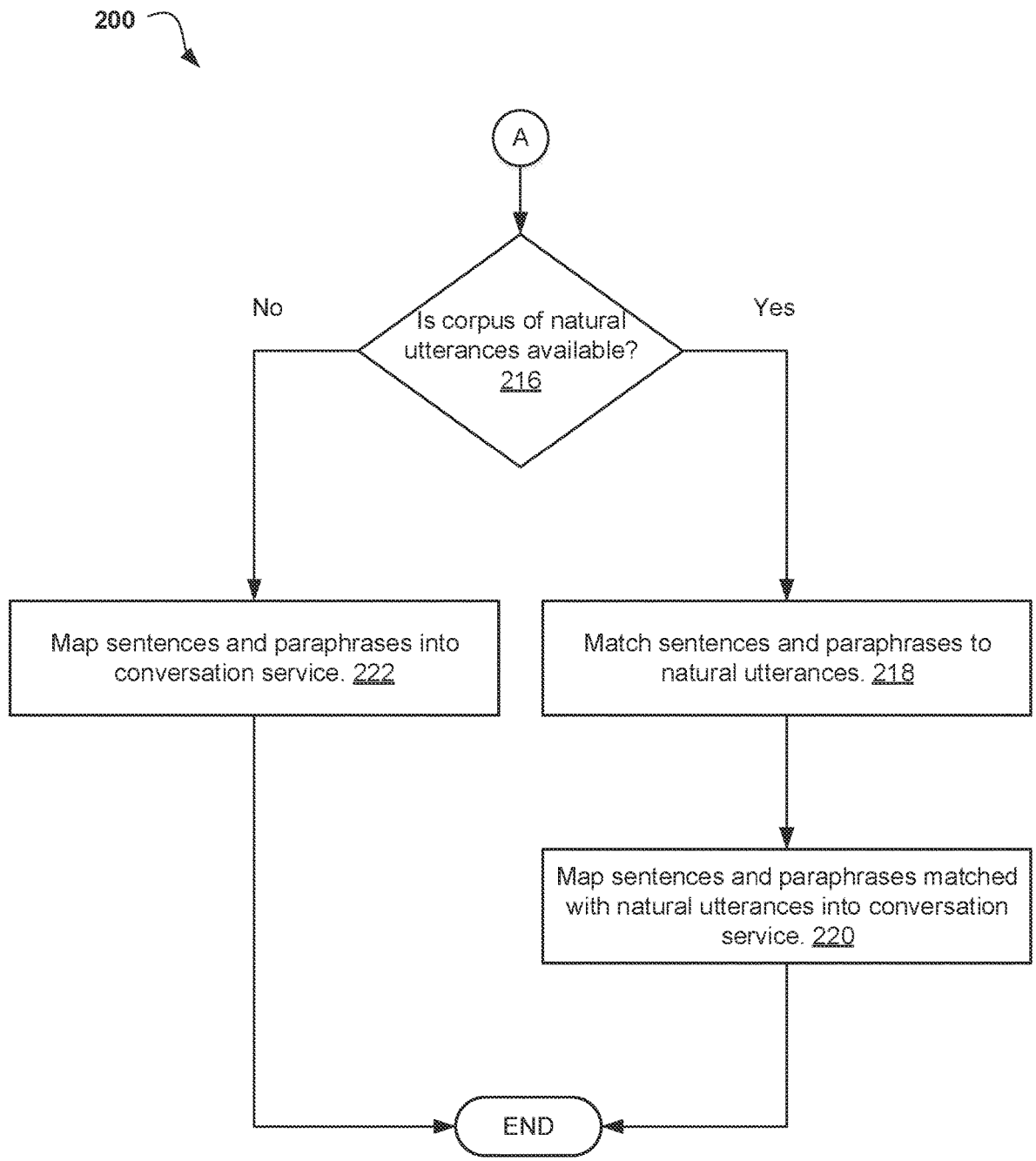
FIG. 2B illustrates a continuation of the operational flowchart depicted in FIG. 2A according to at least one embodiment.

Referring now to FIG. 2B, a continuation of the operational flowchart for creating a dialog based on anticipated questions for database driven conversations in an anticipatory dialog design process 200 is depicted according to at least one embodiment. At 216, the anticipatory dialog design program 110A, 110B determines whether the corpus of natural utterances is available. The corpus may include natural language text relevant to a particular business. For example, the corpus may contain a history of chat records from one or more customers querying a database. These chat records may be compared with the prioritized and selected sentences and paraphrases described above. In response to determining the corpus is available (step 216, "Yes" branch), the anticipatory dialog design process 200 proceeds to step 218 to match the one or more sentences and the one or more paraphrases to the natural utterances in the corpus. In response to determining the corpus is not available (step 216, "No" branch), the anticipatory dialog design process 200 proceeds to step 222 to map the one or more sentences and the one or more paraphrases into the conversation service.

Next, at 218, the anticipatory dialog design program 110A, 110B matches the one or more sentences and the one or more paraphrases to the natural utterances in the corpus. Utilizing NLP, the chat records in the corpus may be compared and matched with the one or more sentences and paraphrases. In this manner, potential customer questions may additionally be anticipated based on actual questions previously asked of the database. For example, the sentence "What restaurants are in Manhattan?" described above created from the combinations of modular phrases may have been previously asked by a customer either verbatim (i.e., "What restaurants are in Manhattan?") or paraphrased (i.e., "What food places are in Manhattan?"). The anticipatory dialog design program 110A, 110B may notify the user via the UI that the sentence "What restaurants are in Manhattan?" was matched with a corresponding question in the corpus.

Then, at 220, the anticipatory dialog design program 110A, 110B maps the one or more sentences and the one or more paraphrases that are matched with the natural utterances into the conversation service. According to at least one other embodiment, once the user is notified of the matching, the user may decide whether to map the matched sentence and paraphrase into the conversation service. According to at least one further embodiment, to assist the user, the anticipatory dialog design program 110A, 110B may re-rank sentences and paraphrases depending upon whether they were matched. For example, a sentence initially assigned a low priority ranking that was matched may then be assigned a higher priority ranking. Continuing the example, a sentence initially assigned a high priority ranking that was not matched may then be assigned a lower priority ranking.

Next, at 222, the anticipatory dialog design program 110A, 110B maps the one or more sentences and the one or more paraphrases into the conversation service. It may be appreciated that in embodiments where the corpus of natural utterances is not available, the one or more sentences and the one or more paraphrases may be mapped into the conversation service without being matched to the chat records. For example, the sentence "What restaurants are in Manhattan?" described above created from the combinations of modular phrases may not have been previously asked by a customer and therefore may not be included in the chat records. According to at least one other embodiment, the user may decide whether to map the unmatched sentence and paraphrase into the conversation service.

In steps 220 and 222, the anticipatory dialog design program 110A, 110B may derive customer intentions, frequently asked questions (FAQ) lists, entity variables, frame and slots, and/or actions from the one or more sentences and paraphrases. For example, when a customer queries a restaurant database, it may be derived that the customer is looking for a place to eat or asking questions about food options for a restaurant. If a customer's utterance is matched to a sentence and/or paraphrase of low confidence (e.g., the confidence score is less than 50%), a follow-up dialog may be presented to the customer to clarify a question that could be asked of the database. For example, the paraphrase "What food places are in Manhattan?" may be created with less than 50% confidence. In this instance, the follow-up dialog may ask the customer, "By food place do you mean restaurant?" If the customer replies "Yes," "food place" and "restaurant" may be associated with each other as synonyms. Contrarily, if the customer replies "No," the anticipatory dialog design program 110A, 110B may ask the customer, "What do you mean by food place?" If the process from which the anticipated questions are produced is carefully recorded, the recording may be used to generate the response to the customer. For example, if the anticipated question is created by combining modular phrases for a specific question target (e.g., the phone number of a restaurant) and those for a set of filtering conditions (e.g., location and cuisine), the target and filters may be used to construct a corresponding SQL query formula to retrieve the answer for the customer.

It may be appreciated that FIGS. 2A and 2B provide only an illustration of one implementation and do not imply any limitations with regard to how different embodiments may be implemented. Many modifications to the depicted environments may be made based on design and implementation requirements.

Figure 3:
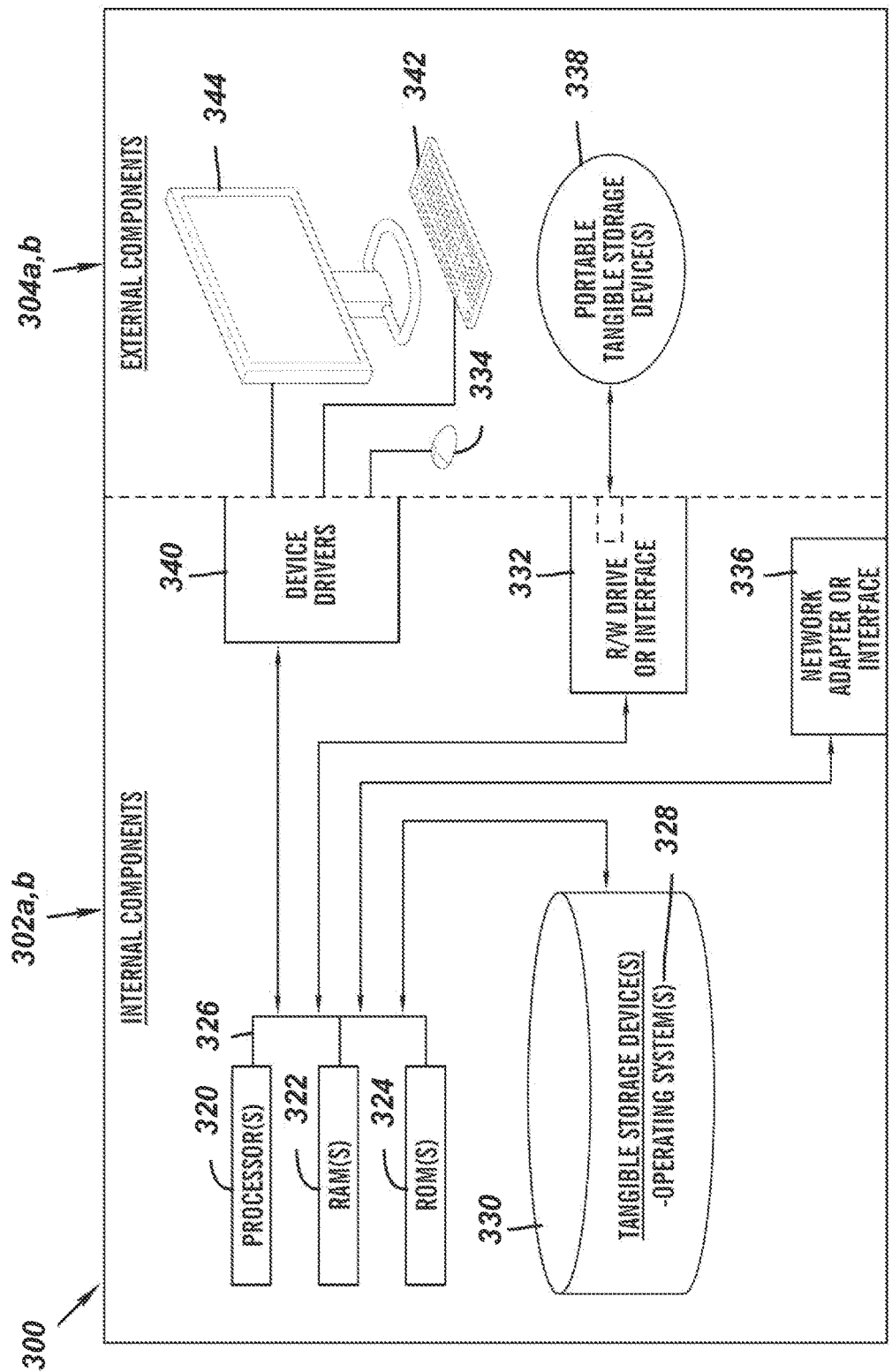
FIG. 3 is a functional block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the anticipatory dialog design program 110A in the client computing device 102 and the anticipatory dialog design program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the anticipatory dialog design program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the anticipatory dialog design program 110A in the client computing device 102 and the anticipatory dialog design program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the anticipatory dialog design program 110A in the client computing device 102 and the anticipatory dialog design program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
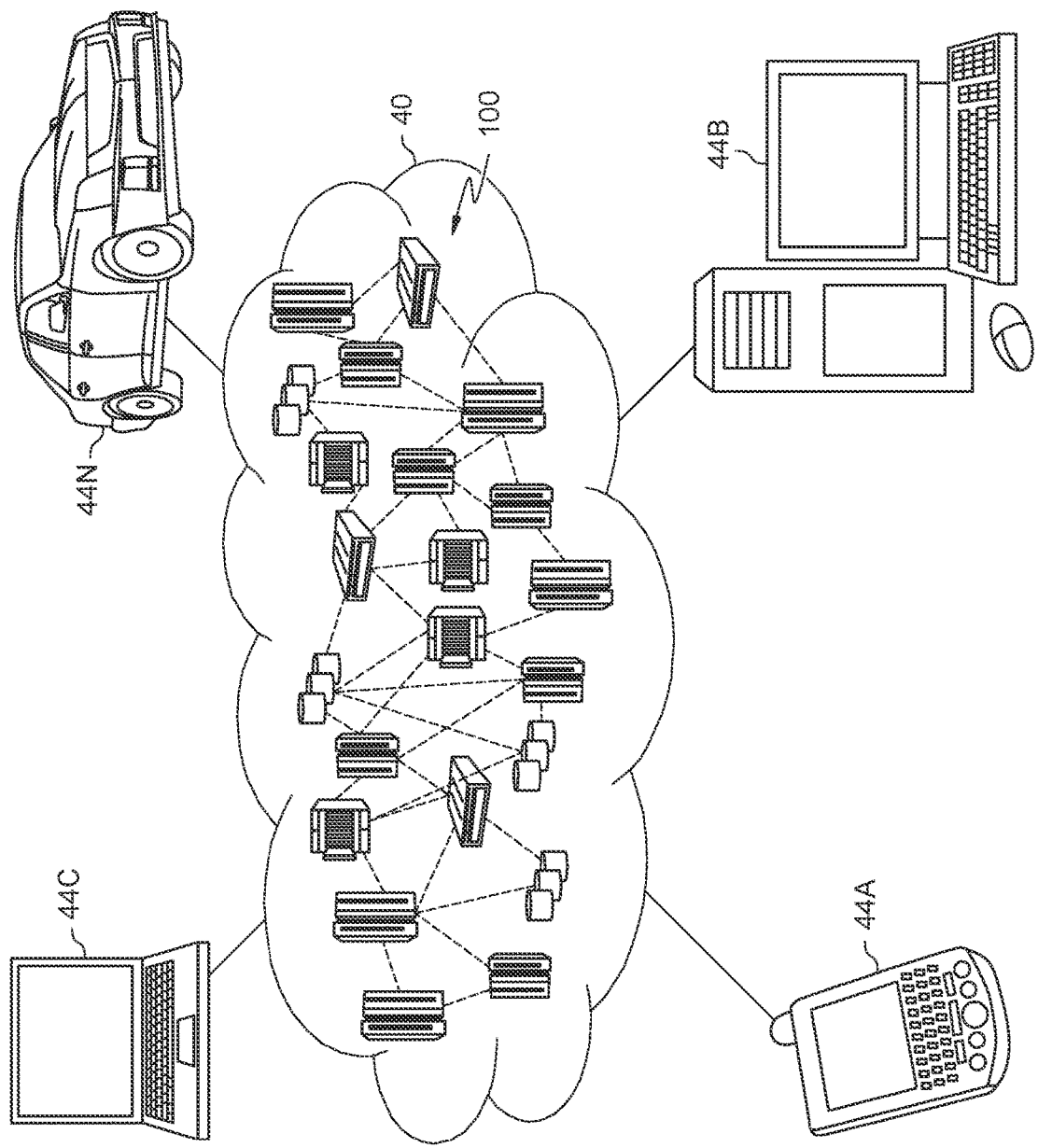
FIG. 4 depicts a cloud computing environment according to an embodiment of the present invention.

Referring now to FIG. 4, illustrative cloud computing environment 40 is depicted. As shown, cloud computing environment 40 comprises one or more cloud computing nodes 100 with which local computing devices used by cloud consumers, such as, for example, personal digital assistant (PDA) or cellular telephone 44A, desktop computer 44B, laptop computer 44C, and/or automobile computer system 44N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 40 to offer infrastructure, platforms and/or software as services for which a cloud consumer does not need to maintain resources on a local computing device. It is understood that the types of computing devices 44A-N shown in FIG. 4 are intended to be illustrative only and that computing nodes 100 and cloud computing environment 40 can communicate with any type of computerized device over any type of network and/or network addressable connection (e.g., using a web browser).

Figure 5:
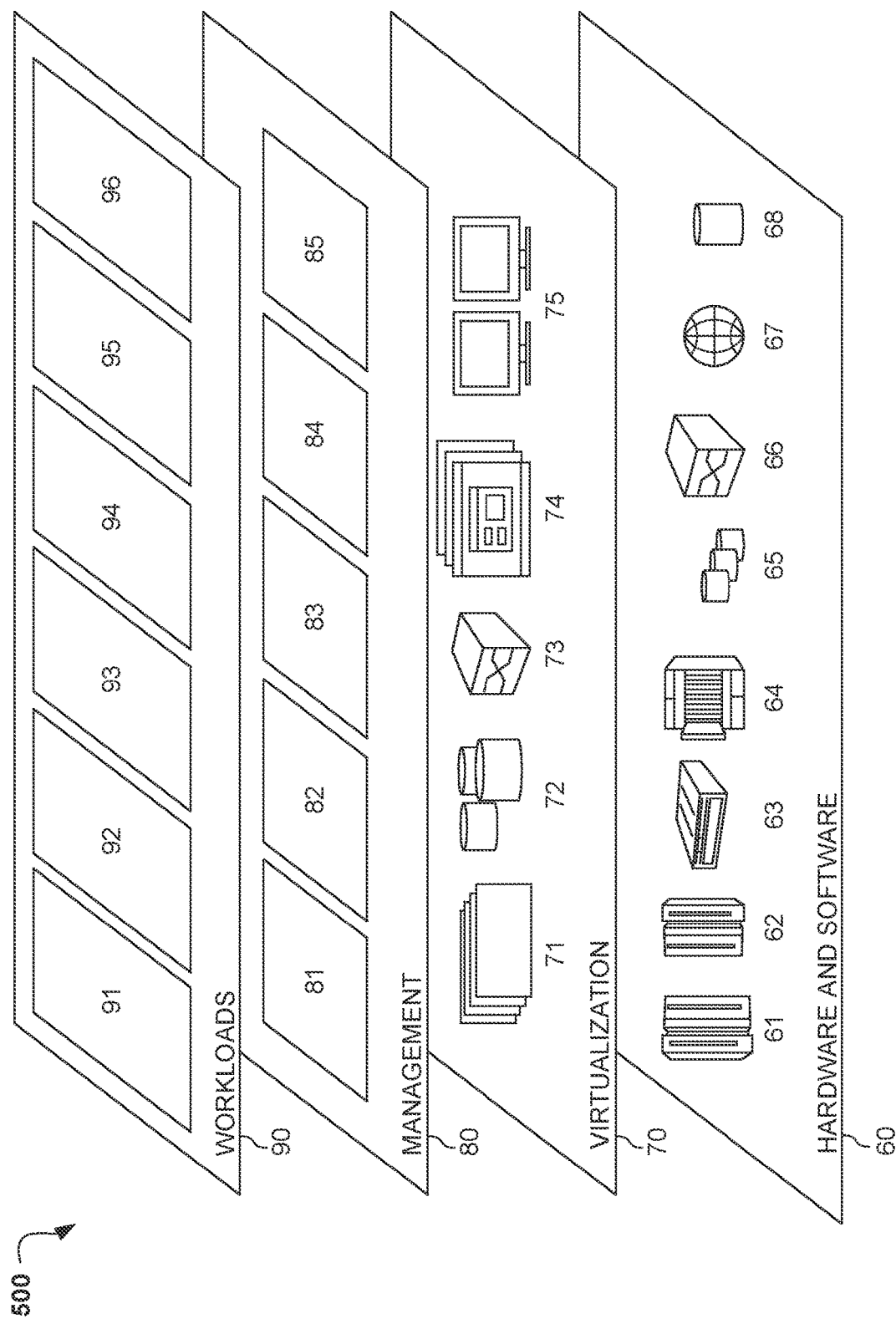
FIG. 5 depicts abstraction model layers according to an embodiment of the present invention.

Referring now to FIG. 5, a set of functional abstraction layers 500 provided by cloud computing environment 40 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and creating a dialog based on anticipated questions for database driven conversations 96. Creating a dialog based on anticipated questions for database driven conversations 96 may relate to identifying a semantic type and number of entities in a relational database in order to generate and combine modular phrases into complete sentences and paraphrases.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of creating a dialog based on anticipated questions, the method comprising:

receiving content from a relational database;

identifying one or more schemas, one or more entities, and relational data in the received content;

identifying a semantic type and a quantity of distinct entries for each entity contained in the relational database;

presenting choices for one or more query targets and one or more filtering conditions to a user based on the received content in the database, wherein the one or more query targets are instances of the one or more entities contained in the relational database, and wherein the one or more filtering conditions are available filters capable of being applied to the relational database;

receiving the chosen one or more query targets and the chosen one or more filtering conditions from the user;

prompting the user for one or more annotations and one or more clarifying questions for each chosen query target and each chosen filtering condition in response to presenting the choices for the one or more query targets and the one or more filtering conditions to the user;

receiving the one or more annotations and the one or more clarifying questions for each chosen query target and each chosen filtering condition from the user;

generating a plurality of modular phrases based on the one or more query targets and the one or more filtering conditions chosen by the user, wherein the plurality of modular phrases include combinations of values of attributes of each chosen query target and each chosen filtering condition in a table of the relational database;

combining the generated plurality of modular phrases into one or more sentences and one or more paraphrases of each sentence based on the identified semantic type of each entity, wherein a natural language generator synthesizes the generated plurality of modular phrases into the one or more sentences, wherein bilingual pivoting automatically generates the one or more paraphrases of each sentence, wherein one or more connecting words and one or more prepositions are added to the one or more sentences and the one or more paraphrases of each sentence based on the identified semantic type of each entity, and wherein combining the generated plurality of modular phrases into the one or more sentences further comprises:
assigning a priority ranking to the one or more sentences and the one or more paraphrases of each sentence based on confidence;
determining whether a corpus of natural utterances is available;
in response to determining the corpus is available, matching the one or more sentences and the one or more paraphrases to the natural utterances in the corpus; and
mapping the one or more sentences and the one or more paraphrases that are matched with the natural utterances into a conversation service, wherein the one or more sentences and the one or more paraphrases are re-ranked based upon whether the one or more sentences and the one or more paraphrases are matched.

2. The method of claim 1, further comprising:
in response to determining the corpus is not available, mapping the one or more sentences and the one or more paraphrases into the conversation service.

3. The method of claim 1, wherein receiving content from the database further comprises:
receiving a specific database connection and access credentials from the user.

4. The method of claim 1, wherein the annotation is selected from a group consisting of a keyword and a synonym.

5. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving content from a relational database;
identifying one or more schemas, one or more entities, and relational data in the received content;
identifying a semantic type and a quantity of distinct entries for each entity contained in the relational database;
presenting choices for one or more query targets and one or more filtering conditions to a user based on the received content in the database, wherein the one or more query targets are instances of the one or more entities contained in the relational database, and wherein the one or more filtering conditions are available filters capable of being applied to the relational database;
receiving the chosen one or more query targets and the chosen one or more filtering conditions from the user;
prompting the user for one or more annotations and one or more clarifying questions for each chosen query target and each chosen filtering condition in response to presenting the choices for the one or more query targets and the one or more filtering conditions to the user;
receiving the one or more annotations and the one or more clarifying questions for each chosen query target and each chosen filtering condition from the user;
generating a plurality of modular phrases based on the one or more query targets and the one or more filtering conditions chosen by the user, wherein the plurality of modular phrases include combinations of values of attributes of each chosen query target and each chosen filtering condition in a table of the relational database;
combining the generated plurality of modular phrases into one or more sentences and one or more paraphrases of each sentence based on the identified semantic type of each entity, wherein a natural language generator synthesizes the generated plurality of modular phrases into the one or more sentences, wherein bilingual pivoting automatically generates the one or more paraphrases of each sentence, wherein one or more connecting words and one or more prepositions are added to the one or more sentences and the one or more paraphrases of each sentence based on the identified semantic type of each entity, and wherein combining the generated plurality of modular phrases into the one or more sentences further comprises:
assigning a priority ranking to the one or more sentences and the one or more paraphrases of each sentence based on confidence;
determining whether a corpus of natural utterances is available;
in response to determining the corpus is available, matching the one or more sentences and the one or more paraphrases to the natural utterances in the corpus; and
mapping the one or more sentences and the one or more paraphrases that are matched with the natural utterances into a conversation service, wherein the one or more sentences and the one or more paraphrases are re-ranked based upon whether the one or more sentences and the one or more paraphrases are matched.

6. The computer system of claim 5, further comprising:
in response to determining the corpus is not available, mapping the one or more sentences and the one or more paraphrases into the conversation service.

7. The computer system of claim 5, wherein receiving content from the database further comprises:
receiving a specific database connection and access credentials from the user.

8. The computer system of claim 5, wherein the annotation is selected from a group consisting of a keyword and a synonym.

9. A computer program product, the computer program product comprising:
one or more non-transitory computer-readable storage medium and program instructions stored on at least one of the one or more non-transitory computer-readable storage medium, the program instructions executable by a processor capable of performing a method, the method comprising:
receiving content from a relational database;
identifying one or more schemas, one or more entities, and relational data in the received content;
identifying a semantic type and a quantity of distinct entries for each entity contained in the relational database;
presenting choices for one or more query targets and one or more filtering conditions to a user based on the received content in the database, wherein the one or more query targets are instances of the one or more entities contained in the relational database, and wherein the one or more filtering conditions are available filters capable of being applied to the relational database;
receiving the chosen one or more query targets and the chosen one or more filtering conditions from the user;
prompting the user for one or more annotations and one or more clarifying questions for each chosen query target and each chosen filtering condition in response to presenting the choices for the one or more query targets and the one or more filtering conditions to the user;

receiving the one or more annotations and the one or more clarifying questions for each chosen query target and each chosen filtering condition from the user;

generating a plurality of modular phrases based on the one or more query targets and the one or more filtering conditions chosen by the user, wherein the plurality of modular phrases include combinations of values of attributes of each chosen query target and each chosen filtering condition in a table of the relational database;

combining the generated plurality of modular phrases into one or more sentences and one or more paraphrases of each sentence based on the identified semantic type of each entity, wherein a natural language generator synthesizes the generated plurality of modular phrases into the one or more sentences, wherein bilingual pivoting automatically generates the one or more paraphrases of each sentence, wherein one or more connecting words and one or more prepositions are added to the one or more sentences and the one or more paraphrases of each sentence based on the identified semantic type of each entity, and wherein combining the generated plurality of modular phrases into the one or more sentences further comprises:

assigning a priority ranking to the one or more sentences and the one or more paraphrases of each sentence based on confidence;

determining whether a corpus of natural utterances is available;

in response to determining the corpus is available, matching the one or more sentences and the one or more paraphrases to the natural utterances in the corpus; and mapping the one or more sentences and the one or more paraphrases that are matched with the natural utterances into a conversation service, wherein the one or more sentences and the one or more paraphrases are re-ranked based upon whether the one or more sentences and the one or more paraphrases are matched.

10. The computer program product of claim 9, further comprising:

in response to determining the corpus is not available, mapping the one or more sentences and the one or more paraphrases into the conversation service.

11. The computer program product of claim 9, wherein receiving content from the database further comprises:

receiving a specific database connection and access credentials from the user.

\* \* \* \* \*